US008745414B2

(12) United States Patent
Hajji et al.

(10) Patent No.: US 8,745,414 B2
(45) Date of Patent: *Jun. 3, 2014

(54) SWITCHING BETWEEN UNSECURE SYSTEM SOFTWARE AND SECURE SYSTEM SOFTWARE

(75) Inventors: Hassan Hajji, Yamato (JP); Seiichi Kawano, Sagamihara (JP); Takao Moriyama, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 81 days.

This patent is subject to a terminal disclaimer.

(21) Appl. No.: 13/436,893

(22) Filed: Mar. 31, 2012

(65) Prior Publication Data

US 2012/0317424 A1 Dec. 13, 2012

Related U.S. Application Data

(62) Division of application No. 11/539,639, filed on Oct. 8, 2006, now Pat. No. 8,234,506.

(51) Int. Cl.
*G06F 21/00* (2013.01)
*G06F 21/57* (2013.01)
*G06F 21/74* (2013.01)

(52) U.S. Cl.
CPC .............. *G06F 21/57* (2013.01); *G06F 21/74* (2013.01); *G06F 2221/2105* (2013.01)
USPC ........... 713/193; 711/100; 711/150; 711/151; 711/163

(58) Field of Classification Search
CPC .. G06F 21/57; G06F 21/74; G06F 2221/2105
USPC ........................................................ 713/193
See application file for complete search history.

(56) References Cited

U.S. PATENT DOCUMENTS

| 4,843,026 | A | * | 6/1989 | Ong et al. ...................... 438/130 |
| 5,081,675 | A | * | 1/1992 | Kittirutsunetorn ........... 713/190 |
| 2001/0056539 | A1 | * | 12/2001 | Pavlin et al. .................. 713/193 |
| 2004/0236959 | A1 | * | 11/2004 | Kudelski et al. ............. 713/193 |
| 2005/0257016 | A1 | * | 11/2005 | Boles et al. .................... 711/163 |

OTHER PUBLICATIONS

Yang et al., Fast Secure Processor for Inhibiting Software Piracy and Tampering, Dec. 2003, Annual IEEE/ACM International Symposium on Microarchitecture, pp. 351-360.*
AMD64 Technology: AMD64 Architecture Programmers Manual vol. 2: System Programming, Publication No. 24593, Revision 3.11, Dec. 2005.

(Continued)

*Primary Examiner* — Mohammad L Rahman
*Assistant Examiner* — Kenneth Chang
(74) *Attorney, Agent, or Firm* — Vazken Alexanian

(57) ABSTRACT

Unsecure system software and secure system software on the same computer system is switched between. A computer system includes one or more processors, which may not have any built-in security features, memory, and firmware. The memory stores secure system software and unsecure system software. In response to receiving a user signal, the firmware switches from the unsecure system software running on the processors to the secure system software running on the processors (and back again). While the unsecure system software is running, the secure system software is protected from tampering by the unsecure system software.

11 Claims, 6 Drawing Sheets

(56) References Cited

OTHER PUBLICATIONS

Bios and Kernel Developer's Guide for AMD Athlon 64 and AMD Opteron Processors, Publication No. 26094, Revision 3.28, Oct. 2005.

Intel 975X Express Chipset Datasheet for the Intel 82975X Memory Controller Hub (MCH), Document No. 310158-001, Nov. 2005.

Robert C. Collins, "The Caveats of System Management Mode," Dr. Dobb's Journal, May 1997.

* cited by examiner

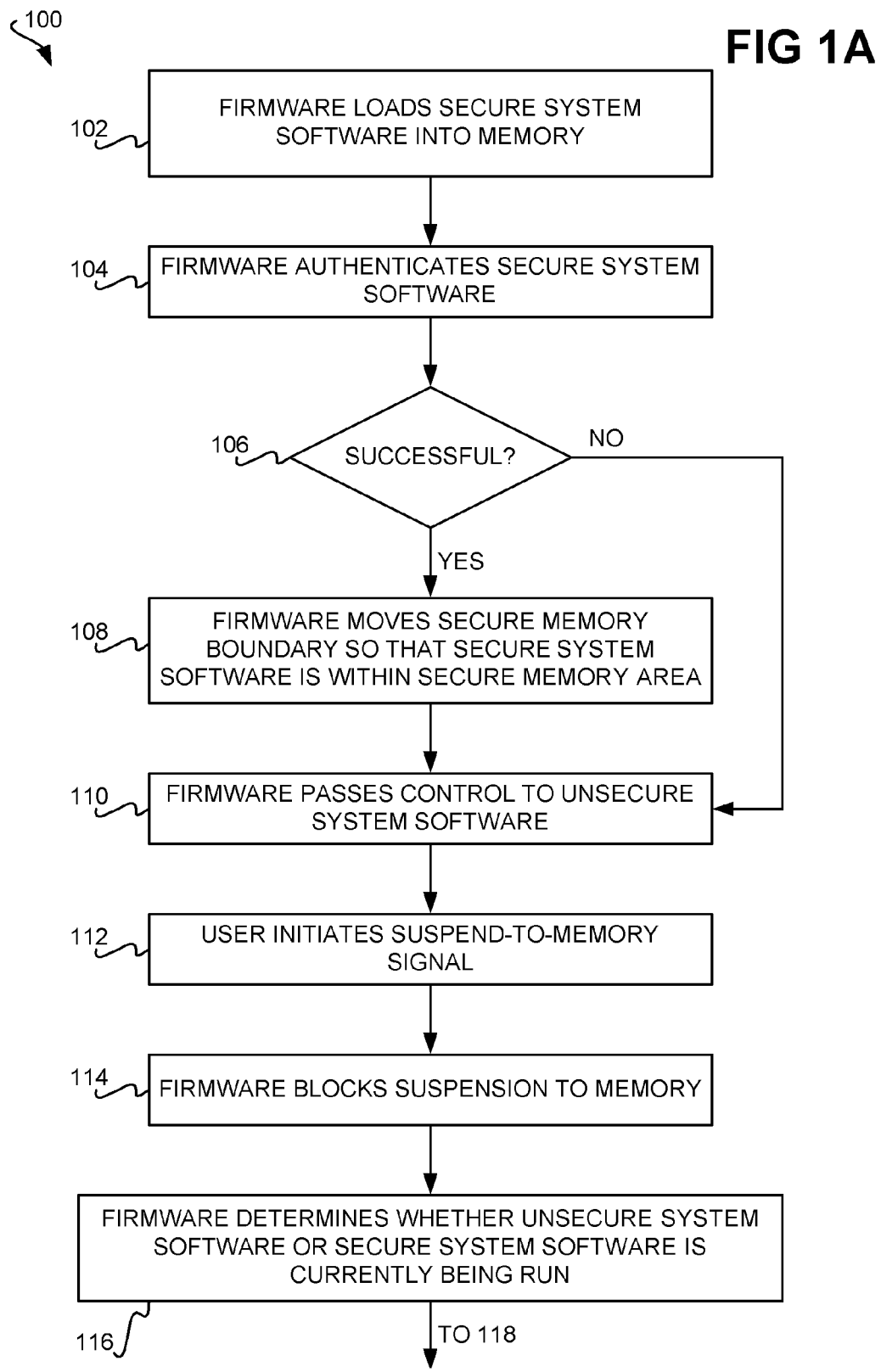

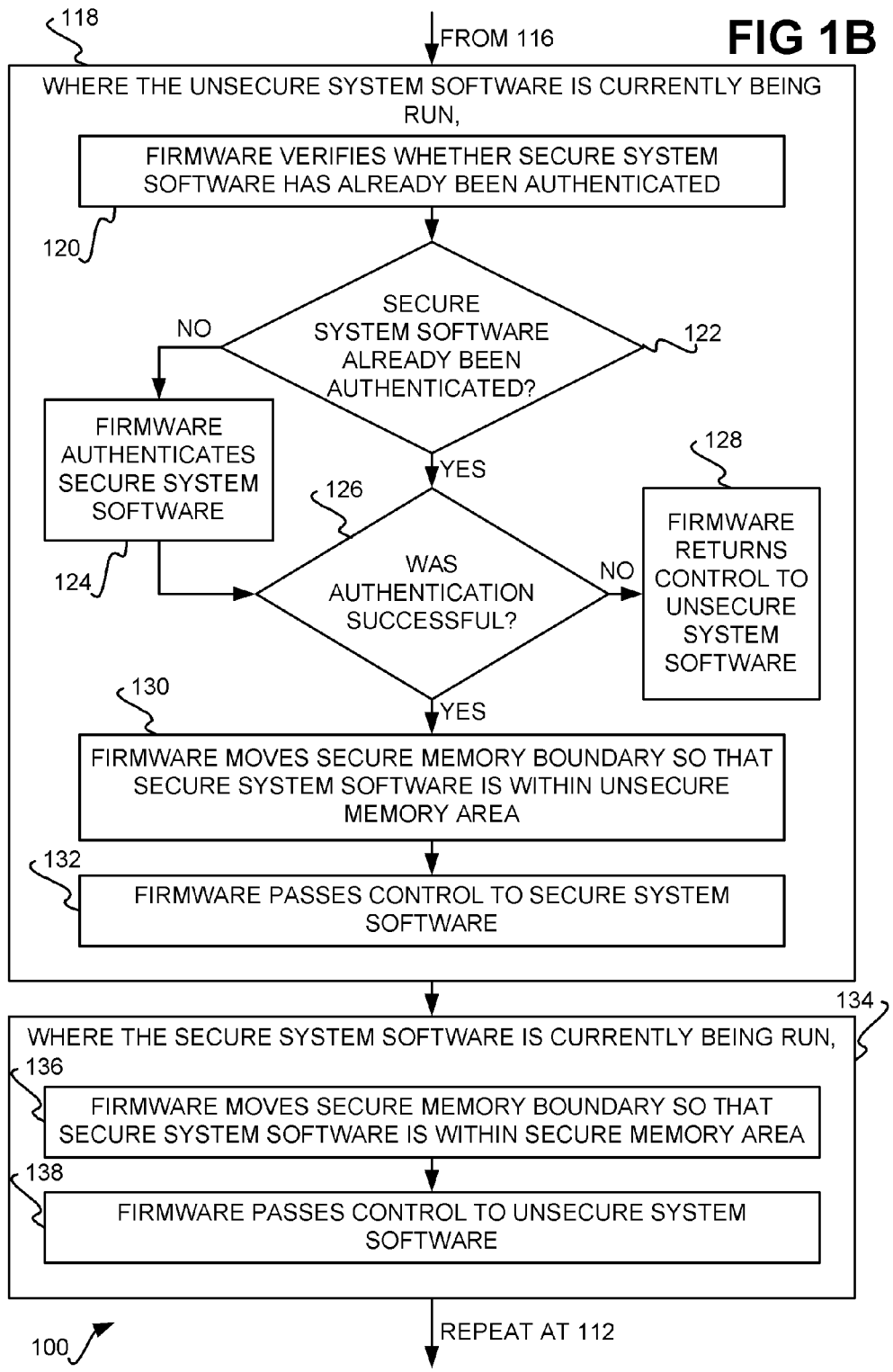

SWITCHING BETWEEN UNSECURE SYSTEM SOFTWARE AND SECURE SYSTEM SOFTWARE

RELATED APPLICATIONS

The present patent application is a continuation of the patent application having the same title, filed on Oct. 8, 2006, and assigned application Ser. No. 11/539,639.

FIELD OF THE INVENTION

The present invention relates generally to being able to use both unsecure system software and secure system software on a computer system at different times, and more particularly to switching between the unsecure system software and the secure system software.

BACKGROUND OF THE INVENTION

Historically, software that has been run on individual computer systems, such as the computing devices used by individual users, has been unsecure. Such unsecure system software includes versions of the Microsoft Windows® operating system, available from Microsoft Corp., of Redmond, Wash., for instance, and is susceptible to tampering and other deleterious effects by malicious and rogue software. For example, computer programs, as well as the operating system itself, can be installed on computers without having to authenticate the programs. As such, these programs are inherently insecure, since it cannot be determined that the program is what it claims to be.

Some computing applications, however, require a more secure environment in which to run, where the system software is not susceptible to tampering and other deleterious effects. Such secure system software may include operating systems and other computer programs that are digitally signed. Therefore, prior to installation on a computing device, it can be verified that the software has not been tampered with, and thus is what it claims to be.

A user may need to be able to switch between secure system software and unsecure system software. When not being run, the secure system software has to be protected from tampering by the unsecure system software, and by programs running in conjunction with the unsecure system software. Within the prior art, being able to switch from secure system software and unsecure system software is typically achieved by using a computing device with a processor that has special security features built-in. These security features enable the processor to ensure that unsecure system software will not tamper with secure system software.

However, computing devices that use such special processors are generally more expensive than computing devices that do not have such special processors, such as computing devices that use currently available processors from Intel Corp., of Santa Clara, Calif., as well as from Advanced Micro Devices, Inc., of Sunnyvale, Calif. Existing computing devices that do not have special processors are also more plentiful than computing devices using special processors. Therefore, running secure system software on the same computing device on which unsecure system software can also be run is difficult to achieve.

SUMMARY OF THE INVENTION

The present invention relates to switching between unsecure system software and secure system software on the same computer system. A computer system of one embodiment of the invention includes one or more processors, which may not have any built-in security features, memory, and firmware. The memory stores secure system software and unsecure system software. In response to receiving a user signal, the firmware switches from the unsecure system software running on the processors to the secure system software running on the processors (and back again). While the unsecure system software is running, the secure system software is protected from tampering by the unsecure system software.

A method of one embodiment of the invention is performed in response to a user initiating a suspend-to-memory signal. The firmware blocks suspension to memory, and determines whether the unsecure system software or the secure system software is currently being run on the processors. Where the unsecure system software is currently being run, the firmware moves a secure memory boundary so that the secure system software is within an unsecure memory area of the memory. The firmware then passes control to the secure system software so that the processors run the secure system software. The secure system software cannot be tampered with by the unsecure system software, due to the unsecure system software no longer being run on the processors.

By comparison, where the secure system software is currently being run, the firmware moves the secure memory boundary so that the secure system software is within a secure memory area of the memory. The firmware then passes control to the unsecure system software so that the processors run the unsecure system software. The secure system software cannot be tampered with by the unsecure system software, due to the secure system software being stored within the secure memory area of the memory. In one embodiment, the secure system software is authenticated exactly once by the firmware at some point in time.

A method of another embodiment of the invention is also performed in response to the user initiating a suspend-to-memory signal. The firmware again blocks suspension to memory, and determines whether the unsecure system software or the secure system software is currently being run on the processors. Where the unsecure system software is currently being run, the firmware moves the secure system software to an unsecure memory area of the memory. The firmware passes control to the secure system software so that the processors run the secure system software. The secure system software cannot be tampered with by the unsecure system software, due to the unsecure system software no longer being run on the processors.

By comparison, where the secure system software is currently being run, the firmware moves the secure system software to the secure memory area of the memory. The firmware passes control to the unsecure system software so that the processors run the unsecure system software. The secure system software cannot be tampered with by the unsecure system software, due to the secure system software being stored within the secure memory area of the memory. In one embodiment, the secure system software is authenticated exactly once by the firmware at some point in time.

Embodiments of the invention provide for advantages over the prior art. At least some embodiments leverage existing secure memory areas of memory associated with firmware, such as the basic input/output system (BIOS), found in nearly all modern computer systems. No special security features are needed in the processors themselves, such that the computer systems do not require e system software is substantially instantaneous in response to the user initiating a signal, such as a suspend-to-memory signal like an Advanced Configuration and Power Interface (ACPI) S3 signal via pressing one or more keys on the keyboard in combination. In some embodiments, this is also particularly because the secure system software is authenticated exactly once by the firmware, such that the secure system software does not have to be authenticated every time when it is desired to be run.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIGS. 1A and 1B are flowcharts of a method for switching between secure system software and unsecure system software, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

FIGS. 1A and 1B show a method 100 for switching between secure system software and unsecure system software, according to an embodiment of the invention. The secure system software may be a secure operating system, or another type of secure software. In one embodiment, the secure system software is secure in that it is authenticated. By being authenticated, it is known that the secure system software has not been modified after being released from its developer, and it is known that the secure system software is what it claims to be. The secure system software may be secure in other ways as well. For instance, the secure system software may inherently be protected from rogue and malicious computer programs, in that a computer program or process cannot be run in conjunction with the secure system software without having been first authenticated, as one example.

By comparison, the unsecure system software may be an unsecure operating system, or another type of unsecure software. Unsecure operating systems include currently available versions of the Microsoft Windows® operating system. Unsecure system software may be unsecure in that it is not authenticated prior to being installed and/or run. The unsecure system software may further be unsecure in other ways. For instance, the unsecure system software may be susceptible to rogue and malicious computer programs that could compromise the unsecure system software, causing it to perform operations that are unknown to and/or undesired by the end user.

The method 100 begins by firmware of a computer system loading the secure system software into memory (102). The firmware of a computer system may be generally and non-restrictively defined as an essential set of computer program code, typically stored in a non-volatile semiconductor memory, that provides an interface between the operating system and the hardware of a computer system. An example of firmware is the basic input/output system (BIOS).

Figure 2A:
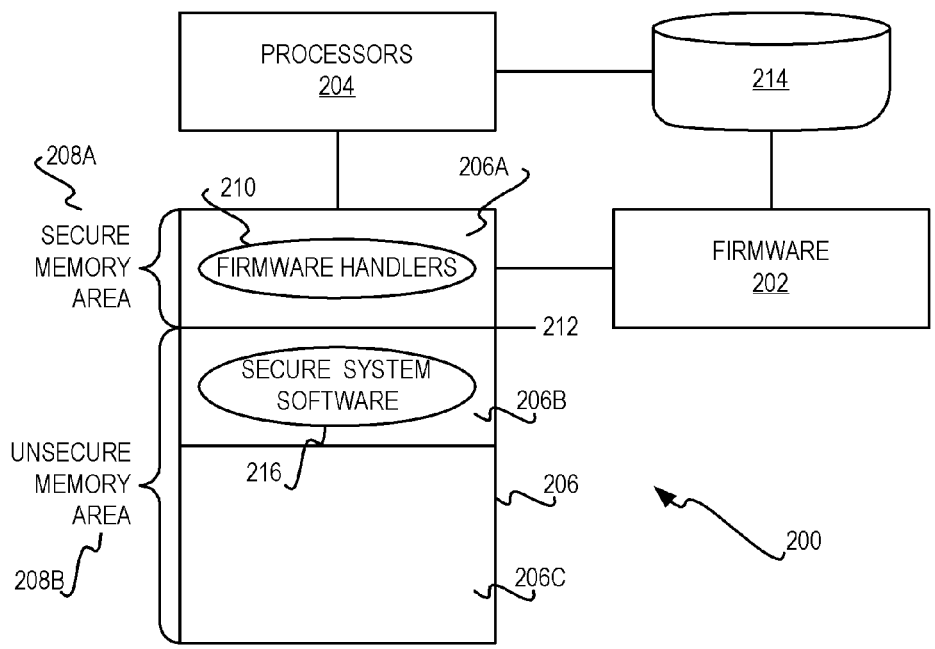
FIGS. 2A, 2B, and 2C are diagrams depicting a representative computer system after performance of various of the parts of the method of FIGS. 1A and 1B, and of the method of FIGS. 3A and 3B in the case of FIG. 2B, according to an embodiment of the invention.

FIG. 2A shows a representative computer system 200 after part 102 of the method 100 has been performed, according to an embodiment of the invention. The computer system 200 includes firmware 202, one or more processors 204, volatile memory 206, such as dynamic random-access memory (DRAM), and a storage device 214, such as a hard disk drive. As can be appreciated by those of ordinary skill within the art, the system 200 can and typically will include other components and/or parts, in addition to and/or in lieu of those depicted in FIG. 2A. The computer system 200 may be a laptop computing device, a desktop computing device, or another type of computing device. The computer system 200 may be that which is normally used by an end user in one embodiment of the invention.

The processors 204 may be those currently available from Intel Corp. and AMD, Inc., and otherwise may be processors that do not have any built-in security features that allow for secure system software to be run within the computer system 200 by virtue of the processors 204 themselves. Thus, embodiments of the invention allow for the secure running of secure system software without requiring the processors 204 to have any built-in security features. The memory 206 is divided into memory areas 206A, 206B, and 206C. The memory area 206A is the portion of the memory 206 reserved for the firmware 202. For instance, the firmware 202 may execute from the memory area 206A, such that firmware handlers 210 and other types of firmware-related computer programs are executed by the processors 204 from the memory area 206A. The firmware 202 may thus be executed by the processors 204 in one embodiment of the invention.

The firmware 202 loads the secure system software 216 from the storage device 214 to the memory area 206B. The memory area 206B may not be predefined in size, but rather is defined as a sufficiently large section of the memory 206 to store at least a portion of the secure system software 216. The loading of the secure system software 216 into the memory area 206B is that which is performed in part 102 of the method 100.

The memory 206 can also be considered as being divided into a secure memory area 208A and an unsecure memory area 208B at a dynamically changeable memory boundary 212. The secure memory area 208A is not accessible by any portion of the unsecure memory area 208B. Therefore, during running of any software within the unsecure memory area 208B by the processors 204, such software cannot access any portion of the secure memory area 208A.

In one embodiment, the secure memory 208A is the system management mode (SMM) memory or RAM, also referred to as SMRAM. The SMRAM is originally intended as a dedicated place within the system memory 206 as a whole that is for the firmware 202, such that only the firmware 202 is capable of accessing the SMRAM. The SMRAM is secure in that the processors 204 cannot access the SMRAM unless the firmware 202 is currently active in what is known as SMM. Therefore, when the processors 204 are running software within the unsecure memory area 208B, outside of the SMRAM, the processors 204 inherently cannot access the secure memory area 208A.

Such security of the SMRAM is inherent in the way that the firmware 202 of a conventional computer system operates, and does not depend on any security features having to be built into the processors 204 themselves. The processors 204 indeed cannot access the SMRAM unless the processors 204 are in SMM. While in SMM, typically just the firmware 202 can be executed. At the very least, no software outside the SMRAM can be executed in SMM, such that the SMRAM is protected from software outside the SMRAM.

Referring back to FIG. 1A, the firmware may authenticate the secure system software (104). Authentication can include analyzing the secure system software against a digital signature of the software to ensure that the software has not been modified since the digital signature was generated. The firmware may store one or more flags having values corresponding to whether or not the secure system software was authenticated, and if it was, whether authentication was successful or not. If authentication is not successful (106), then the firmware proceeds to pass control to the unsecure system software (110). However, if authentication is successful (106), then the firmware first moves a secure memory boundary so that the secure system software is within a secure memory area (108) before passing control to the unsecure system software (110). That is, the normal boot process of the computer system continues, such that the unsecure system software ultimately runs on the computer system at first.

Figure 2B:
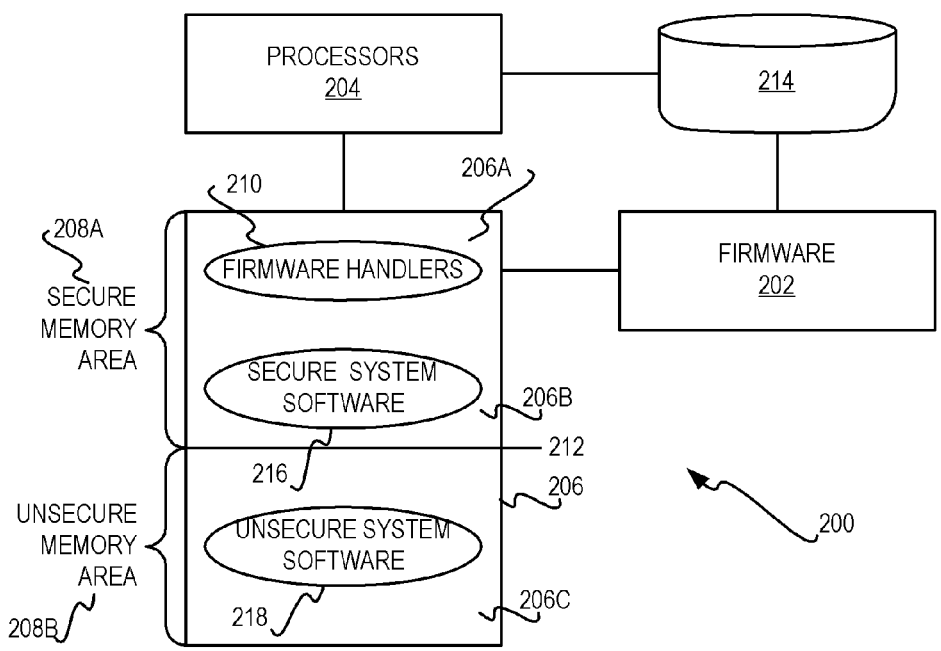

FIG. 2B shows the representative computer system 200 of FIG. 2A after parts 104, 106, 108, and 110 have been performed, where authentication of the secure system software was successful, according to an embodiment of the invention. The firmware 202 has moved the boundary 212 between the secure memory area 208A and the unsecure memory area 208B to encompass the memory area 206B in which the secure system software 216 has been previously loaded. Thus, the secure memory area 208A now encompasses both the memory areas 206A and 206B, such that both the firmware handlers 210 and the secure system software 216 are within the secure memory area 208A. The unsecure system software 218 has been loaded into the memory area 206C as part of the normal boot process, and is within the unsecure memory area 208B.

Loading of the secure system software 216 and the unsecure system software 218 as has been described, and moving the boundary 212 so that the secure memory area 208A includes the memory areas 206A and 206B storing the firmware handlers 210 and the secure system software 216, provides for security as follows. The unsecure system software 218, as a result of the normal boot process, is the software that is currently running on the processors 204. That is, the secure system software 216 is not currently running on the processors 204, at least in part because it may not be able to be run while the memory area 206B is encompassed by the secure memory area 208A. In other words, while the secure system software 216 is in the secure memory area 206B, it may not be able to be run.

Therefore, the memory area 206A is still protected from the memory area 206B, even though both memory areas 206A and 206B are encompassed by the secure memory area 208A, because the secure system software 216 cannot run while it is in the secure memory area 208A. As such, the secure system software 216 cannot modify the firmware handlers 210. Furthermore, the secure memory area 208A is protected from the unsecure memory area 208B that is coincident with the memory area 206C. This is because the unsecure memory area 208B cannot access the secure memory area 208A, as has been described. As such, the unsecure system software 218, even though it is running on the processors 204, cannot access the secure system software 216 and the firmware handlers 210, because it cannot access the memory areas 206A and 206B, since the memory areas 206A and 206B are within the secure memory area 208A.

Therefore, at least some embodiments of the invention leverage the existing SMRAM of the computer system 200 to protect the secure system software 216 from the unsecure system software 218 while the latter is running on the processors 204 and the former is not. In particular, these embodiments inventively modify the boundary 212 separating SMRAM from the rest of the DRAM of the computer system 200 to encompass the memory area 206B that is storing the secure system software 216 while the secure system software 216 is not running on the processors 204. The unsecure system software 218 cannot access the secure system software 216 in the same way as it cannot conventionally access the firmware handlers 210. The secure system software 216 is thus protected from tampering by the unsecure system software 218.

Referring back to FIG. 1A, while the unsecure system software is running on the processors, a user may initiate a suspend-to-memory signal (112) to switch from the unsecure system software to the secure system software (and vice-versa). The suspend-to-memory signal is more generally a user-initiated signal. The user may, for instance, press one or more keys on the keyboard of the computer system to generate the signal. The suspend-to-memory signal may be an Advanced Configuration Power Interface (ACPI) S3 signal, which normally causes the generation of an interrupt that a firmware handler processes to cause the computer to suspend execution to memory. Such suspension to memory is in comparison to suspension to a hard disk drive or another non-volatile storage, for instance, which is commonly referred to as standby mode.

In response the firmware intercepts the suspend-to-memory signal, and blocks suspension of the computer system to memory (114). Rather than suspending the computer system to memory, the firmware causes the computer system to switch from running the unsecure system software to the secure system software, or vice-versa. For instance, the firmware may issue a system management interrupt (SMI), or another type of interrupt. The issuance of the interrupt is then processed by an interrupt handler of the firmware. The interrupt handler of the firmware is pre-designed to switch the computer system from running the unsecure system software to the secure system software, and vice-versa, as is now described in more detail. Until the firmware passes or returns control to system software in part 128, part 132, or part 138 of the method 100, the computer system may remain in SMM in one embodiment.

The firmware first determines whether the unsecure system software or the secure system software is currently being run on the processors of the computer system (116). That particular software is currently being run means the software that is and/or was running at the time that the user initiated the suspend-to-memory signal. Thus, the nomenclature "the current system software currently being run" means the current system software that is and/or was running at the time that the user initiated the suspend-to-memory signal.

Where the unsecure system software is currently being run (118), the following is performed. First, the firmware verifies whether the secure system software has already been authenticated (120). For example, the flags that may have been previously set in part 104 may be inspected to determine whether authentication has occurred, and whether such authentication was successful or not. However, although the method 100 has been described as the firmware having authenticated the secure system software in part 104, in some embodiments the firmware may not perform this initial authentication. If the secure system software has not yet already been authenticated (122), then the firmware authenticates the secure system software (124), where part 124 is performed as has been described in relation to part 104 of the method 100.

When the secure system software has been or is authenticated, the results of such authentication may be successful or unsuccessful. If authentication was not successful (126), then the firmware returns control to the unsecure system software (128), and the method 100 is terminated. That is, if the secure system software cannot be successfully authenticated, then the firmware never allows the secure system software to be run. The user thus cannot switch running from the unsecure system software to the secure system software in this situation.

However, if authentication of the secure system software was successful (126), then the firmware moves the dynamically changeable secure memory boundary so that the secure system software is within the unsecure memory area (130), and passes control to the secure system software (132). As such, SMM may be exited by the firmware. Moving the boundary so that the secure system software is within the unsecure memory area allows the secure system software to run on the processors. The secure system software is still protected from tampering by the unsecure system software, since the unsecure system software is no longer running on the processors. That is, either the secure system software runs on the processors or the unsecure system software runs on the processors, and never both. Furthermore, the firmware handlers stored in the secure memory area remain protected from the secure system software, since they remain in the secure memory area and are not accessible by the secure system software, because the secure system software is now in the unsecure memory area.

Figure 2C:
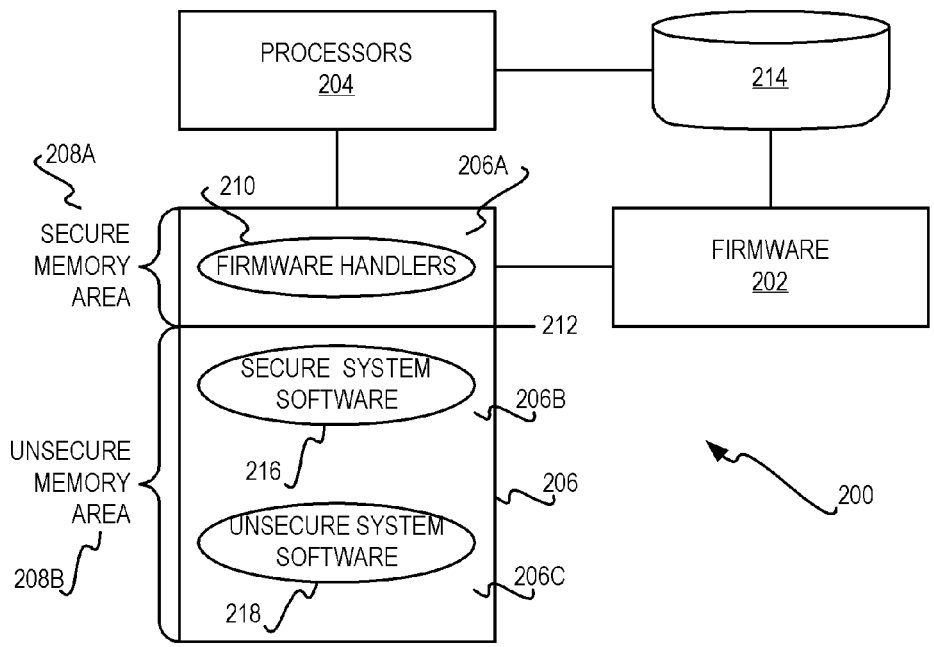

FIG. 2C shows the representative computer system of FIG. 2B after parts 112, 114, 116, and 118 of the method 100 have been performed, according to an embodiment of the invention. The firmware 202 blocks the suspension to memory initiated by the user generating a suspend-to-memory signal. The firmware 202 instead generates an interrupt that is intercepted and handled by one of the firmware handlers 210 within the secure memory area 208A. Assuming current or previous authentication of the secure system software 216, this firmware handler causes the firmware 202 to move the boundary 212 to encompass just the memory area 206A.

As such, the secure memory area 208A is coincident with the memory area 206A, and no longer encompasses the memory area 206B. Likewise, the unsecure memory area 208B now encompasses the memory areas 206B and 206C. Because the secure system software 216 is stored in the memory area 206B, the secure system software 216 is now within the unsecure memory area 208B, and not the secure memory area 208A. The firmware 202 then passes control to the secure system software 216, such that the software 216 is run on the processors 204. The secure system software 216 is protected from tampering by the unsecure system software 218, because the unsecure system software 218 no longer is running once the secure system software 216 is running. Furthermore, the firmware handlers 210, and the memory area 206A more generally, are protected from the secure system software 216, since the latter is now within the unsecure memory area 208B, whereas the former are in the secure memory area 208A.

Referring back to FIG. 1B, if the determination in part 116 of the method 100 instead yields that the secure system software is currently being run on the processors (134), then the following is performed. First, the firmware moves the dynamically changeable secure memory boundary so that the secure system software is again within the secure memory area (136), and passes control to the unsecure system software (138). As such, SMM may be exited by the firmware.

Moving the boundary so that the secure system software is again within the secure memory area protects the secure system software from being tampered by the unsecure system software, since the secure memory area cannot be accessed by the unsecure system software, which instead resides in the unsecure memory area. The firmware handlers stored in the secure memory area remain protected from the unsecure system software, since at least in some embodiments they are always stored in the secure memory area. The firmware handlers are also protected from the secure system software, since the latter is no longer running. The method 100 repeats at part 112, such that each time the user initiates a suspend-to-memory signal in part 112, the firmware performs parts 114, 116, and 118 or 134. Thus, the user is able to switch from running the unsecure system software to running the secure system software, and vice-versa.

The representative computer system of FIG. 2C after parts 112, 114, 116, and 134 of the method 100 have been performed is identical to FIG. 2B that has already been presented and described. Thus, the firmware 202 blocks the suspension to memory initiated by the user generating a suspend-to-memory signal. The firmware 202 instead generates an interrupt that is intercepted and handled by one of the firmware handlers 210 within the secure memory area 208A. This firmware handler causes the firmware 202 to move the boundary 212 to encompass both the memory areas 206A and 206B.

As such, the secure memory area 208A again encompasses the memory area 206B, whereas the unsecure memory area again is coincident with the memory area 206C. Because the secure system software 216 is stored in the memory area 206B, the secure system software 216 is again within the secure memory area 208A, and not the unsecure memory area 208B. The firmware 202 then passes control to the unsecure system software 218, such that the software 218 is run on the processors 204. The secure system software 216 is protected from tampering by the unsecure system software 218, because the latter is within the unsecure memory area 208B, whereas the former is in the secure memory area 208A. Likewise, the firmware handlers 210, and the memory area 206A more generally, are protected from the unsecure system software 218 for the same reason. The firmware handlers 210 are protected from the secure system software 216 because the latter is no longer running.

It is noted that in the method 100 of FIGS. 1A and 1B, at least in some embodiments of the invention, the secure system software is successfully or unsuccessfully authenticated no more than, and exactly, one time. That is, the secure system software does not have to be authenticated each time the user switches from the unsecure system software to the secure system software. Rather, once the secure system software has been authenticated once, either successfully or unsuccessfully, the firmware does not perform authentication again. Therefore, assuming successful authentication of the secure system software, switching from the unsecure system software to the secure system software occurs relatively quickly.

Figure 3A:
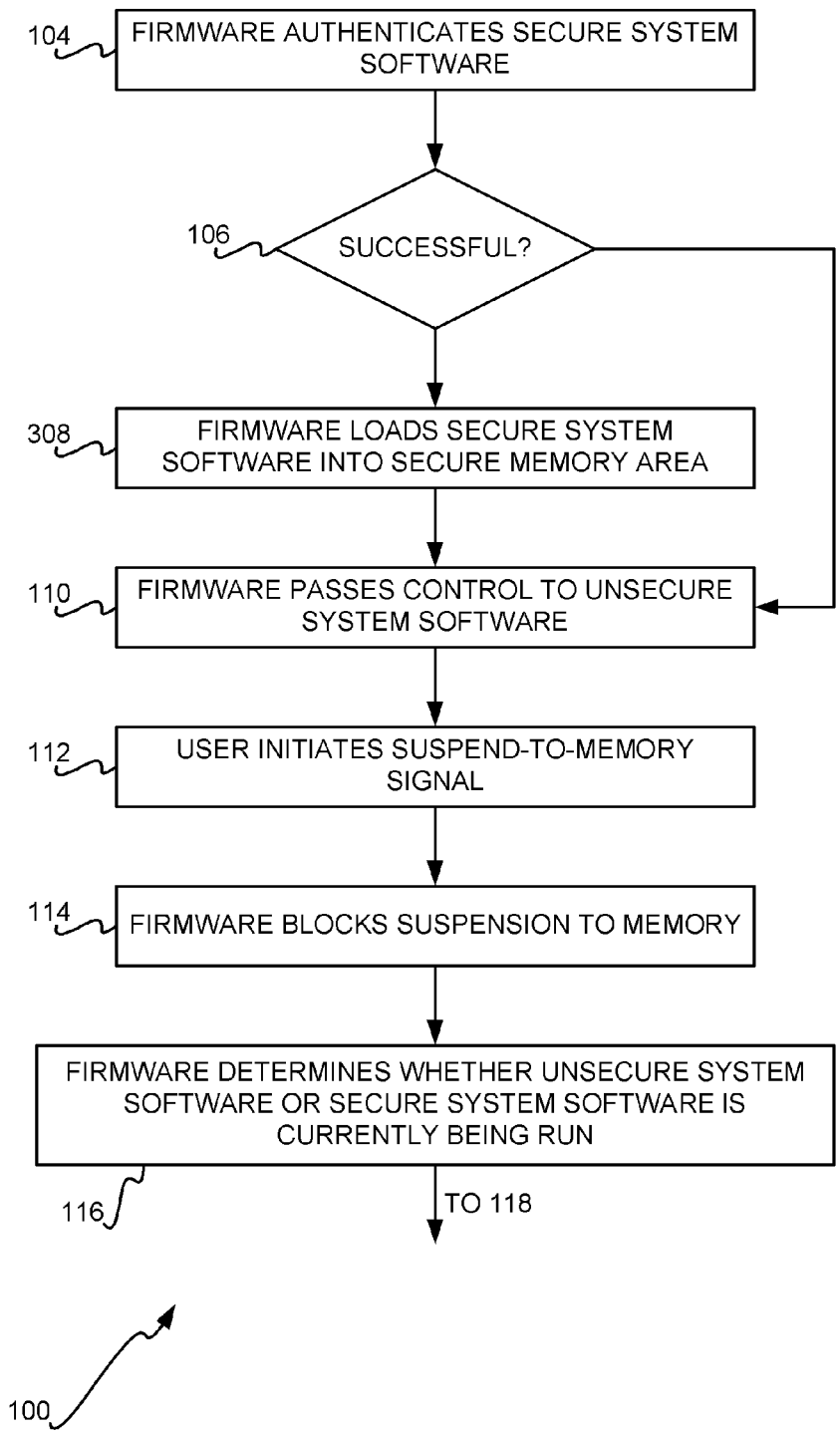
FIGS. 3A and 3B are flowcharts of a method for switching between secure system software and unsecure system software, according to another embodiment of the invention.
Figure 3B:
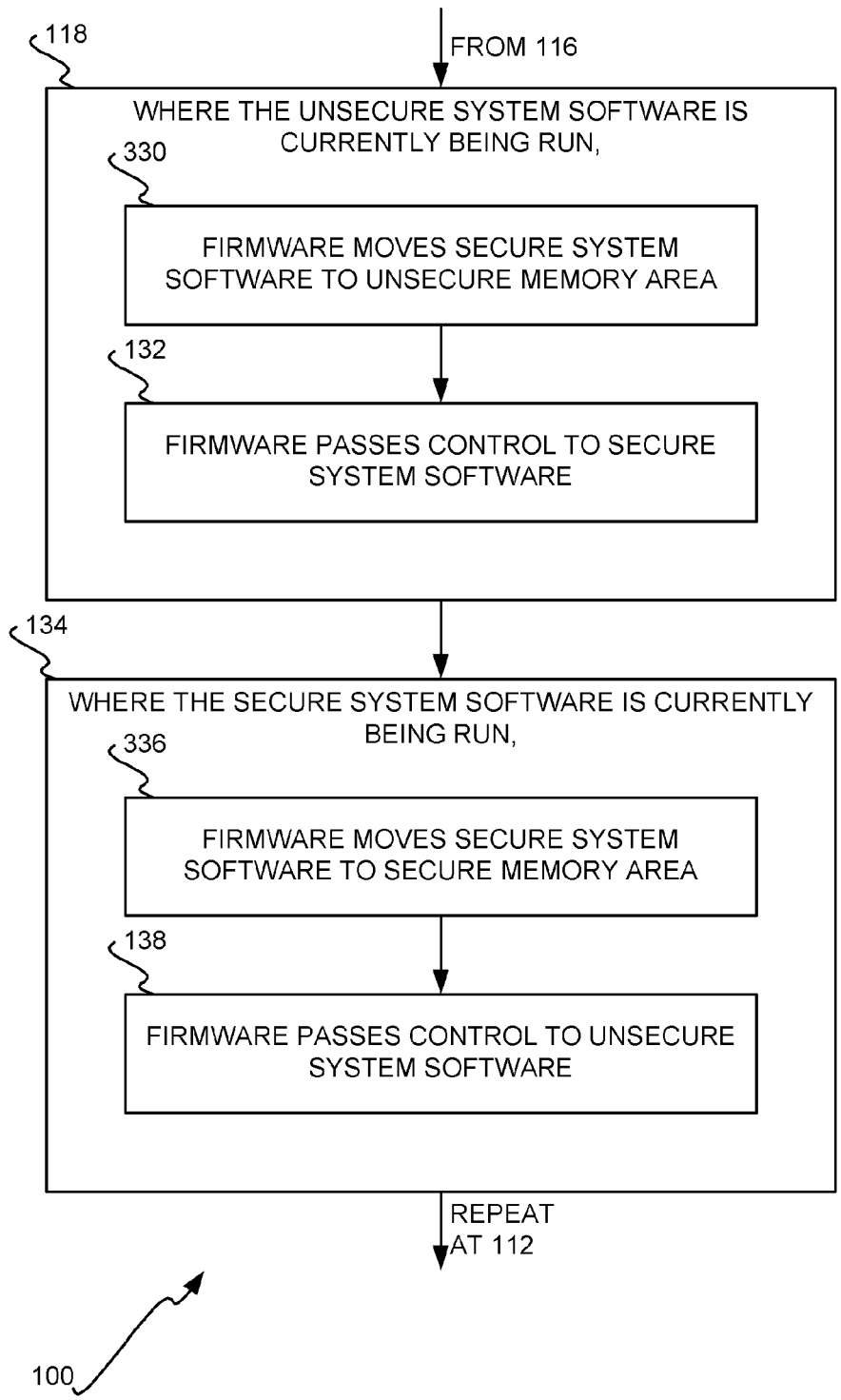

FIGS. 3A and 3B show the method 100 for switching between secure system software and unsecure system software, according to a different embodiment of the invention. The method 100 of the embodiment of FIGS. 1A and 1B is such that to switch between secure system software and unsecure system software, a secure memory boundary is moved. By comparison, as will be described, the method 100 of the embodiment of FIGS. 3A and 3B achieves such switching by moving the secure system software between the secure memory area and the unsecure memory area. The method 100 of this embodiment is particularly suited for situations where the secure system software is relatively small in size, such that it can be fitted within SMRAM, for instance, without having to change the secure memory boundary.

The method 100 of FIGS. 3A and 3B begins by the firmware authenticating the secure system software (104). Where such authentication is successful, the firmware loads the secure system software into the secure memory area (308). It is noted that this process is different than parts 102 and 108 of the method 100 of FIGS. 1A and 1B, where first the secure system software is loaded into memory, and then the secure memory boundary is moved such that the area of memory into which the secure system software has been loaded is encompassed by the secure memory area. In part 308 of the method 100 of FIGS. 1A and 1B, by comparison, the secure system software is directly loaded into the secure memory area. This is further why authentication is performed before loading the secure system software. Since the secure system software is loaded directly into the secure memory area, it has to be ensured that this software is authenticated successfully prior to loading. Thereafter, the firmware passes control to the unsecure system software (110) as before, such that the normal boot process continues and the unsecure system software is also loaded into memory.

FIG. 2B that has been described also shows a representative computer system after parts 104, 106, 308, and 110 of the method 100 of FIGS. 3A and 3B have been performed, according to an embodiment of the invention. However, whereas FIG. 2B has been described in relation to the method 100 of FIGS. 1A and 1B where the secure memory area boundary 212 has been moved to encompass the memory area 206B in which the secure system software 216 is located, this is not the case after performing parts 104, 106, 308, and 110 of the method 100 of FIGS. 3A and 3B. Rather, the memory area boundary 212 is never moved, but the secure system software 216 is loaded into the secure memory area 208A initially. Thus, in performing the method 100 of FIGS. 3A and 3B, the computer system 200 never enters the state reflected in FIG. 2A.

The secure system software 216 is thus loaded into the memory area 206B, where the memory areas 206A and 206B are a priori and always part of the secure memory 208A. By comparison, the unsecure memory area 208B always encompasses and is coincident with just the memory area 206C in this embodiment. The unsecure system software 218 is thus loaded into the unsecure memory 208B/memory area 206C. The memory boundary 212 is never modified in the method 100 of FIGS. 3A and 3B.

It is noted that two different approaches may be employed to reserve, or allocate, space within the memory 206 for the secure system software 216. First, a dedicated area for the secure system software 216 be may reserved within the memory area 206C. In such instance, there must be enough space within the memory 206 to hold both the unsecure system software 218 and the secure system software 216. Thus, the secure system software 216 has space reserved for it in both the memory areas 206B and 206C.

Second, when the secure system software 216 is moved, data may be swapped so that duplicate space is not reserved for the secure system software 216 in both the memory areas 206B and 206C. In this approach, the secure system software 216 does not have space allocated for it within the memory area 206C, such that the unsecure system software 218 may occupy all of the memory area 206C. When the secure system software 218 is to be moved to the memory area 206C, an arbitrary space may be selected within the memory area 206C that can store the secure system software 218. As such, the contents of the selected portion of this memory area 206C are swapped with the contents of the memory area 206B corresponding to the storage of the secure system software 218 within the memory area 206B. This latter approach may be desired because the secure system software 216 does not have to have space reserved for it in both the memory areas 206B and 206C.

Referring back to FIG. 3A, while the unsecure system software is running on the processors, a user may initiate a suspend-to-memory signal (112), as before, to switch from the unsecure system software to the secure system software (and vice-versa). In response the firmware intercepts the suspend-to-memory signal, and blocks suspension of the computer system to memory (114), also as before. Rather, the firmware causes the computer system to switch from the unsecure system software running on the processors to the secure system software running on the processors, or vice-versa. As before, the firmware may issue an SMI, or another type of interrupt, which is then processed by an interrupt handler of firmware. Until the firmware passes control to system software in part 132 or part 138 of the method 100 of FIGS. 3A and 3B, the computer system may remain in SMM in one embodiment.

The firmware again determines whether the unsecure system software or the secure system software is currently being run on the processors of the computer system (116). Where the unsecure system software is currently being run (118), the following is performed. First, the firmware moves the secure system software from the secure memory area to the unsecure memory area (330). Second, the firmware passes control to the secure system software (132). As such, SMM may be exited by the firmware.

It is presumed that the secure system software has been successfully authenticated in the method 100 of FIGS. 3A and 3B, because otherwise the secure system software would not have been loaded into the secure memory area in the first place. However, where such authentication has not yet occurred, it may occur as part of part 118 of FIGS. 3A and 3B, where successful such authentication yields loading of the secure system software directly into the unsecure memory area for passing control to in order to run the secure system software on the processors. Unsuccessful authentication means, as before, that control is returned to the unsecure system software.

Figure 4:
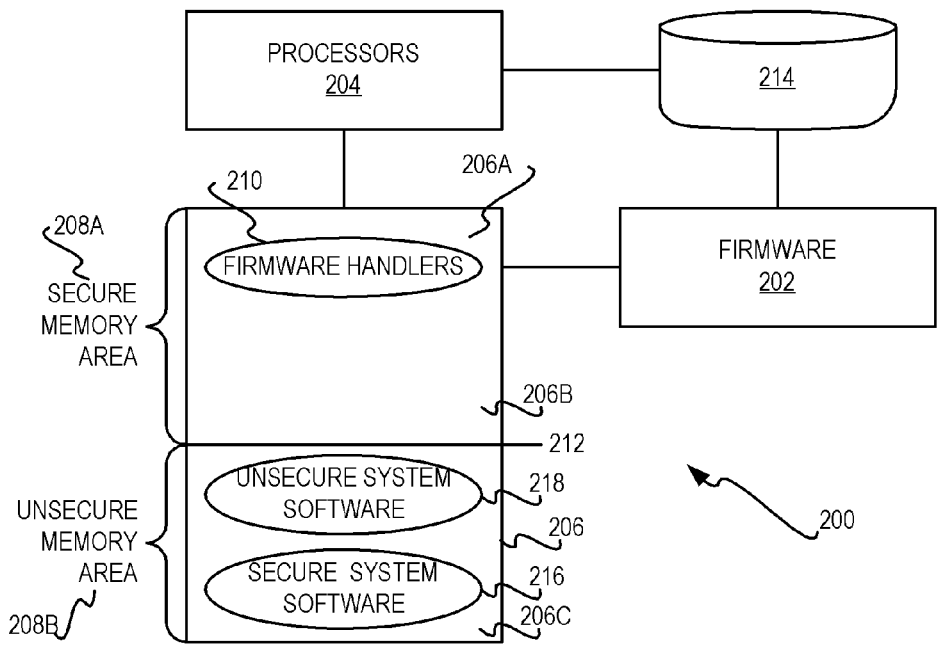
FIG. 4 is a diagram depicting a representative computer system after performance of various of the parts of the method of FIGS. 3A and 3B, according to an embodiment of the invention.

FIG. 4 shows the representative computer system of FIG. 2B after parts 112, 114, 116, and 118 of the method 100 of FIGS. 3A and 3B have been performed, according to an embodiment of the invention. The firmware 202 blocks the suspension to memory initiated by the user generating a suspend-to-memory signal. The firmware 202 instead generates an interrupt that is intercepted and handled by one of the firmware handlers 210 within the secure memory area 208A. The firmware handler causes the firmware 202 to move the secure system software 216 from the memory area 206B within the secure memory area 208A to the memory area 206C within the unsecure memory area 208B.

As such, the secure memory area 208A still encompasses the memory areas 206A and 206B, and the unsecure memory area 208B still encompasses and is coincident with the memory area 206C. That is, the memory boundary 212 has not been moved. Rather, the secure system software 216 itself has been moved from the memory area 206B of the secure memory area 208A to the memory area 206C of the unsecure memory area 208B. The firmware 202 passes control to the secure system software 216, such that the software 216 is run on the processors 204. The secure system software 216 is protected from tampering by the unsecure system software 218, because the unsecure system software 218 is no longer running once the secure system software 216 is running. Furthermore, the firmware handlers 210, and the memory area 206A and 206B more generally, are protected from the secure system software 216, since the latter is now within the unsecure memory area 208B, whereas the former remain in the secure memory area 208A.

Referring back to FIG. 3B, if the determination in part 116 of the method 100 of FIGS. 3A and 3B instead yields that the secure system software is currently being run on the processors (134), then the following is performed. First, the firmware moves the secure system software from the unsecure memory area back to the secure memory area (336), and passes control to the unsecure system software (138). As such, SMM may be exited by the firmware.

Moving the secure system software so that it is again within the secure memory area protects the secure system software from being tampered by the unsecure system software, since the secure memory area cannot be accessed by the unsecure system software, which instead resides in the unsecure memory area. The firmware handlers stored in the secure memory area remain protected from the unsecure system software, since at least in some embodiments they are always stored in the secure memory area. The firmware handlers are also protected from the secure system software, since the secure system software is no longer running. The method 100 of FIGS. 3A and 3B repeats at part 112, such that each time the user initiates a suspend-to-memory signal in part 112, the firmware performs 114, 116, and 118 or 134. Thus, the user is able to switch from running the unsecure system software to running the secure system software, and vice-versa.

The representative computer system of FIG. 4 after parts 112, 114, 116, and 134 of the method 100 of FIGS. 3A and 3B have been performed is identical to FIG. 2B that has already been presented and described. Thus, the firmware 202 blocks the suspension to memory initiated by the user generating a suspend-to-memory signal. The firmware 202 instead generates an interrupt that is intercepted and handled by one of the firmware handlers 210 within the secure memory area 208A. This firmware handler causes the firmware 202 to move the secure system software 216 from the memory area 206C of the unsecure memory area 208B back to the memory area 206B of the secure memory area 208A.

The firmware 202 then passes control to the unsecure system software 218, such that the software 218 is run on the processors. The secure system software 216 is protected from tampering by the unsecure system software 218, because the latter has remained within the unsecure memory area 208B, whereas the former has been moved back to the secure memory area 208A. Likewise, the firmware handlers 210, and the memory area 206A more generally, are protected from the unsecure system software 218 for the same reason. The firmware handlers 210 are protected from the secure system software 216 because the latter is no longer running.

As in the method 100 of FIGS. 1A and 1B, it is noted that in the method 100 of FIGS. 3A and 3B, at least in some embodiments of the invention, the secure system software is successfully or unsuccessfully authenticated no more than, and exactly, one time. That is, the secure system software does not have to be authenticated each time the user switches from the unsecure system software to the secure system software. Rather, once the secure system software has been authenticated once, either successfully or unsuccessfully, the firmware does not perform authentication again. Therefore, assuming successful authentication of the secure system software, switching from the unsecure system software to the secure system software occurs relatively quickly. special processors. Furthermore, switching between the secure system software and the unsecure It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A computer system comprising:
one or more processors;
memory comprising a secure memory area and an unsecure memory area divided by a secure memory boundary separating a first part of the memory from a second part of the memory, the first part of the memory being the secure memory area and the second part of the memory being the unsecure memory area, the memory storing secure system software and unsecure system software, the secure system software being secure in that the secure system software is digitally signed such that whether the secure system software has been tampered with can be detected, the unsecure system software being unsecure in that whether the unsecure system software has been tampered with cannot be determined; and
firmware to, in response to receiving a user-initiated suspend-to-memory signal, block suspensions to the memory,
wherein the firmware is to determine whether the unsecure system software or the secure system software is currently being run on the processors,
wherein where the unsecure system software is currently being run, the firmware is to move the secure memory boundary so that the secure system software is within the unsecure memory area, where before the secure system software was within the secure memory area, such the secure system software itself is not moved within the memory,
wherein where the unsecure system software is currently being run, the firmware is to pass control to the secure system software so that the processors run the secure system software such that the secure system software cannot be tampered with by the unsecure system software due to the unsecure system software no longer being run on the processors,
wherein where the secure system software is currently being run, the firmware is to move the secure memory boundary so that the secure system software is within the secure memory area, where before the secure system software was within the unsecure memory area, such that the secure system software Is not moved within the memory, wherein where the secure system software is currently being run, the firmware is to pass control to the unsecure system software so that the processors run the unsecure system software such that the secure system software cannot be tampered with by the unsecure system software due to the secure system software being stored within the secure memory area.

2. The computer system of claim 1, wherein the firmware is initially to load the secure system software into the second part of the memory, and upon authenticating the secure system software, move the secure memory boundary so that the secure memory area encompasses the second part of the memory.

3. The computer system of claim 2, wherein the firmware authenticates the secure system software exactly once, regardless of how many times the unsecure system software is switched to the secure system software and vice-versa.

4. The computer system of claim 1, wherein the secure memory area stores firmware-related software, such that while either the unsecure system software or the secure system software is running, the firmware-related software is protected from tampering.

5. The computer system of claim 1, wherein the firmware is initially to, upon authenticating the secure system software, load the secure system software into the secure memory area.

6. The computer system of claim 5, wherein the firmware authenticates the secure system software exactly once, regardless of how many times the unsecure system software is switched to the secure system software and vice-versa.

7. The computer system of claim 1, wherein the user-initiated suspend-to-memory signal comprises a user pressing one or more keys to generate a suspend-to memory signal.

8. The computer system of claim 7, wherein the firmware, in response to receiving the suspend-to-memory signal, is to issue an interrupt that is handled by an interrupt handler of the firmware to switch from the unsecure system software to the secure system software, the interrupt handler stored in the secure memory area of the memory.

9. The computer system of claim 7, wherein the suspend-to-memory signal is an Advanced Configuration and Power Interface (ACPI) S3 signal.

10. The computer system of claim 1, wherein the processors have no built-in security features.

11. The computer system of claim 1, wherein the firmware is a basic input/output system (BIOS).

* * * * *